(12) United States Patent  
Dang et al.

(10) Patent No.: US 11,643,954 B2  
(45) Date of Patent: May 9, 2023

(54) OXIDATION CATALYSTS FOR DESTRUCTING VOCS WHICH CONTAIN LIGHT ALKANE COMPOUNDS IN EMISSIONS

(71) Applicant: Clariant International Ltd, Muttenz (CH)

(72) Inventors: Zhongyuan Dang, Prospect, KY (US); Karen Buckman, Louisville, KY (US); Gregory Cullen, Amesbury, MA (US); Seyma Ortatatli, Bavaria (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 17/498,782

(22) Filed: Oct. 12, 2021

(65) Prior Publication Data

US 2022/0136418 A1 May 5, 2022

Related U.S. Application Data

(60) Provisional application No. 63/109,378, filed on Nov. 4, 2020.

(51) Int. Cl.
*B01J 21/04* (2006.01)
*B01J 21/06* (2006.01)
(Continued)

(52) U.S. Cl.
CPC .............. *F01N 3/103* (2013.01); *B01J 6/001* (2013.01); *B01J 23/42* (2013.01); *B01J 35/04* (2013.01);
(Continued)

(58) Field of Classification Search
CPC . B01J 21/04; B01J 21/066; B01J 21/08; B01J 23/42; B01J 23/44; B01J 23/462;
(Continued)

(56) References Cited

U.S. PATENT DOCUMENTS 6,140,539 A    10/2000   Sander  
6,813,884 B2   11/2004   Shigapov  
(Continued)

FOREIGN PATENT DOCUMENTS

CN    102580734    7/2012  
CN    103990460    8/2014  
(Continued)

OTHER PUBLICATIONS

H. Stotz, "Surface reaction kinetics of methane oxidation over PdO" Journal of Catalysis 370 (2019), 152-175.
(Continued)

*Primary Examiner* — Cam N. Nguyen

(57) ABSTRACT

Disclosed herein are monolith oxidation catalysts for the destruction of CO and volatile organic compounds (VOC) chemical emissions, in particular, the destruction of light alkane organic compounds. The catalysts contain high surface area refractory oxides of silica- and hafnia-doped zirconia and silica, or tin oxide or stabilized alumina; and at least one platinum group metals, in particular platinum metal, or a combination of platinum and palladium.

24 Claims, 3 Drawing Sheets

(51) Int. Cl.
*B01J 21/08* (2006.01)
*B01J 23/42* (2006.01)
*B01J 23/44* (2006.01)
*B01J 23/46* (2006.01)
*B01J 23/62* (2006.01)
*B01J 23/63* (2006.01)
*B01J 35/04* (2006.01)
*B01J 35/10* (2006.01)
*B01J 37/00* (2006.01)
*B01J 37/02* (2006.01)
*B01J 37/04* (2006.01)
*F01N 3/10* (2006.01)
*B01J 6/00* (2006.01)

(52) U.S. Cl.
CPC ....... *B01J 35/1014* (2013.01); *B01J 35/1019* (2013.01); *B01J 37/0009* (2013.01); *B01J 37/0215* (2013.01); *B01J 37/04* (2013.01); *F01N 2570/10* (2013.01)

(58) Field of Classification Search
CPC ........ B01J 23/464; B01J 23/626; B01J 23/63; B01J 35/04; B01J 35/1014; B01J 35/1019; B01J 37/0009; B01J 37/0215; B01J 37/04; B01J 6/001; F01N 3/103
USPC ........ 502/258–262, 302–304, 332–334, 339, 502/349, 355, 415, 439
See application file for complete search history.

(56) References Cited

U.S. PATENT DOCUMENTS

| | | | |
|---|---|---|---|
| 7,138,358 B2* | 11/2006 | Huang | F01N 3/035 502/262 |
| 7,235,507 B2* | 6/2007 | Xu | B01J 23/626 502/64 |
| 7,332,454 B2* | 2/2008 | Dang | B01D 53/944 502/79 |
| 7,498,288 B2 | 3/2009 | Matsueda | |
| 7,892,507 B2 | 2/2011 | Rohart | |
| 8,475,755 B2* | 7/2013 | Dang | B01J 37/0242 423/247 |
| 10,569,256 B2* | 2/2020 | Dang | B01J 23/626 |
| 10,974,198 B2 | 4/2021 | Wei | |
| 2004/0192546 A1* | 9/2004 | Dang | B01D 53/864 502/332 |

FOREIGN PATENT DOCUMENTS

| | | |
|---|---|---|
| CN | 107537524 | 1/2018 |
| CN | 109821536 | 5/2019 |

OTHER PUBLICATIONS

Son Hoang, "High performance diesel oxidation catalysts using ultra-low Pt loading on titania nanowire array integrated cordierite honeycombs" Catalysis Today 320 (2019), 2-10.

Peipei Zhao, "Understanding the Role of NbOx on Pt/Al2O3 for Effective Catalytic Propane Oxidation" Ind Eng Chem. Res.58 (2019), 21945-21952.

Jonghyun Kim, "Oxidation of C3H8, iso-C5H12 and C3H6 under near-stoichiometric and fuellean conditions over aged Pt-Pd/Al2O3 catalysts with different Pt:Pd ratios" Applied Catalysis B: Environmental 251 (2019) 283-294.

Son Hoang, "Activating low-temperature diesel oxidation by single-atom Pt on TiO2 nanowire array" Nature Communications (2020) 11:1062.

Nadezda Sadokhina, "An Experimental and Kinetic Modelling Study for Methane Oxidation over Pd-based Catalyst: Inhibition by Water" Catal Lett (2017) 147:2360-2371.

* cited by examiner

OXIDATION CATALYSTS FOR DESTRUCTING VOCS WHICH CONTAIN LIGHT ALKANE COMPOUNDS IN EMISSIONS

CROSS-REFERENCE TO RELATED APPLICATIONS

This application claims priority to U.S. Provisional Patent Application Ser. No. 63/109,378 filed Nov. 4, 2020, which is incorporated herein by reference in its entirety.

INVENTION

The scope of embodiments disclosed herein generally relates to monolith oxidation catalysts for the destruction of compounds such as but not limited to carbon monoxide (CO), volatile organic compounds (VOCs), in particular, for the destruction of light alkane organic compounds in emission off-gas.

BACKGROUND

Chemical plant off-gas emissions contain mostly VOCs, including light alkane VOCs. Consequently, the removal of VOCs from these emissions is important as they are considered a global greenhouse gas, harmful to the atmosphere, environment, and humans. Currently, adsorption, thermal incineration and catalytic oxidation are among the technological approaches used to remove such pollutants and harmful chemicals in chemical plant off-gas emissions, including CO and VOCs.

Current technologies, however, have disadvantages and drawbacks. Thermal incineration requires high operating temperatures (800-1000° C.) and high capital cost on facilities and operation. One alternative presently used is adsorption by adsorbents such as carbon. However, this process does not destroy the pollutants, but merely concentrates them. Furthermore, adsorption efficiency can be adversely impacted by fluctuating concentrations of the gaseous components and overall time on stream.

In some embodiments, oxidation catalysts are used for destroying CO and VOCs found in emissions. Notwithstanding, the present state of their use is marked by limits in the ability to adequately destroy VOCs that contain light alkane compounds, such as methane, ethane, propane and butane. One problem encountered is that the efficiency of current VOC destruction catalysts is not adequate enough to destroy and otherwise mitigate against the presence in the emissions of light alkane compounds such as those mentioned at relatively low temperatures, especially under high-water content steam conditions. As one example of this problem, the presence of higher water content in the feed stream may lead to a 100-300° C. shift of the light-off temperature of methane oxidation to high temperatures. One study reported a 250° C. light-off temperature shift to high temperature in the presence of 12% water in the feed stream for methane oxidation over a conventional $Pd/Al_2O_3$ catalyst. "Surface reaction kinetics of methane oxidation over PdO," Journal of Catalysis, 370 (2019), 152-175. Another study reported that 2.5% water content in a feed stream reduced propane conversion by 20% over a conventional $Pt/Nd/Al_2O_3$ catalyst. "Understanding the role of NbOx on $Pt/Al_2O_3$ for effective catalytic propane oxidation," Ind. Eng. Chem. Res. 58 (2019), 21945-21952.

As an example of a current problem in the removal of light alkane compounds, which are in off-gas emissions from acrylic acid production plants, the off-gases normally contain compounds that include carbon monoxide, acetic acid, propylene, propane, and various VOCs. Before these off-gases can be vented to the atmosphere, these compounds must be destroyed, normally by catalytic oxidation. Current catalysts used for such oxidation process are required to operate at high temperatures to destruct or eliminate light alkane compounds, such as ethane and propane. To overcome such limitations, currently available oxidation catalysts are required to operate at prohibitively high temperatures to maintain sufficiently high destruction efficiency for light alkane compounds in an off-gas stream, especially in the presence of higher water content in an off-gas stream, sometimes referred to as a feed stream. Accordingly, a need exists for improved catalysts that facilitate the oxidation destruction of light alkane compounds and other VOC with durable hydrothermal stability.

SUMMARY

Disclosed herein are monolith oxidation catalysts used for destruction through catalytic oxidation of a number of compounds, which may include CO and volatile organic compounds (VOCs) that contain light alkane compounds, such as methane, ethane, propane and butane. Advantages associated with the oxidation catalysts of the present disclosure, not seen to the same degree with prior oxidation catalysts, are marked by lower light-off temperatures for the oxidation destruction of light alkane compounds under high water content steam condition, thereby providing improved efficiency and energy economy for destruction of harmful chemicals found in emissions, which after destruction can be vented to the atmosphere.

In some embodiments, the oxidation catalysts are deposited on monolith substrates (also referred to as monolithic substrates). Suitable monolith substrates include ceramic substrates, metal substrates and ceramic or metal foam substrates in some embodiments. Present embodiments include oxidation catalysts comprising a silica- and hafnia-doped zirconia support and platinum, or a combination of palladium and platinum, to destruct CO and VOCs which contain light alkane VOCs from chemical plant off-gas emissions.

In some embodiments, the catalyst materials contain high surface area refractory oxides of silica- and hafnia-doped zirconia and silica, or tin oxide or stabilized alumina; and at least one platinum group metal. In some embodiments, platinum or a combination of platinum and palladium may be substituted with other platinum group metals (e.g., rhodium, ruthenium). In at least one aspect, inventive oxidation catalysts of the present disclosure catalyze oxidation reactions for the destruction of off-gas emissions from chemical plants, such as acrylic acid or acrylonitrile production plants, which normally have plant off-gas containing carbon monoxide, acetic acid, propylene and light alkane compounds, such as ethane and propane.

In some embodiments, an oxidation catalyst deposited on a monolith substrate is utilized for the destruction of CO and VOCs, particularly including light alkane compounds VOCs, from an emissions stream, wherein the oxidation catalyst comprises at least one platinum group metal, supported on refractory oxides comprising high surface area materials, including preferably a solid solution of silica- and hafnia-doped zirconia and silica; and/or tin oxide; and/or stabilized alumina. Exemplary uses include, but are not limited to, the oxidation catalyst being utilized for the destruction of off-gas emissions at catalyst bed temperatures from 250-550° C. Preferably, the substrate is a honeycomb structure, a monolithic structure or sphere beads.

Embodiments described herein also include processes for the preparation of oxidation catalysts deposited on a substrate for the destruction of CO and VOCs, particularly light alkane VOCs, from an emissions stream at temperatures from 250-550° C., comprising preparing and blending an aqueous mixture of high surface area refractory oxides, preferably comprising a silica- and hafnia-doped zirconia with silica or tin oxide or stabilized alumina; coating the substrate with the blended mixture; drying and calcining the coated substrate; depositing at least one platinum group metal on the calcined coated substrate, preferably platinum or a combination of platinum and palladium; and an additional platinum group metal, and calcining the platinum group metal coated substrate. Alternatively, the platinum group metals can be blended with the high surface area refractory oxides and deposited on the substrate in a single processing step. Preferably, the high surface area refractory oxides are blended in aqueous mixture by the addition of silica or tin oxide or stabilized alumina with binder materials. Accordingly, embodiments described herein provide for the destruction of CO and VOCs, particularly light alkane VOCs, from off-gas emissions, particularly chemical plant off-gas emissions, by passing said emissions over the above-described catalyst at temperatures from 250° C.-550° C.

BRIEF DESCRIPTION OF FIGURES

The drawings, graphs, figures, and descriptions contained in this application are to be understood as illustrative of steps, structures, features, and aspects of the present embodiments. Accordingly, the scope of embodiments is not limited to features, dimensions, scales, and arrangements shown in the figures.

MULTIPLE EMBODIMENTS AND ALTERNATIVES

Monolith oxidation catalysts according to present embodiments disclosed herein comprise monolith substrates which are coated with high surface area refractory oxides of silica- and hafnia-doped zirconia and silica, or tin oxide or stabilized alumina; and at least one platinum group metal. Such monolith catalysts are suitable for the oxidation destruction of CO and VOCs which contain light alkane compounds. In some embodiments, oxidation catalyst material comprise a precious metal or precious metal components supported on high surface area refractory oxides of silica and hafnia-doped zirconia, and silica or tin oxide or stabilized alumina. In some embodiments, such precious metal is chosen from platinum (Pt) and palladium (Pd) or combinations thereof. Alternatively, rhodium (Rh) or ruthenium (Ru) can be used. In some embodiments, a precious metal component is referred to as a combination of platinum and at least one of Pd, Rh, or Ru.

In accordance with present embodiments and alternatives, the precious metal component (including combinations as mentioned in the preceding paragraph) is supported on high surface area refractory oxides. But unlike conventional supports for oxidation catalysts, which contain silica-doped zirconia and silica, or tin oxide, or stabilized alumina, the precious metals of the oxidation catalysts according to multiple embodiments and alternatives are supported on high surface area supports containing silica- and hafnia-doped zirconia.

Still further, in some embodiments, other high surface area refractory oxides, such as silica, silica-alumina, rare-earth oxides stabilized alumina, silica-titania, ceria-zirconia, titania-zirconia, are used as supports for the oxidation catalysts. In particular, silica, or tin oxide, or stabilized alumina also serve as an active component for the oxidation destruction of CO, VOCs that contain light alkane compounds, and other pollutants.

Methods for producing such oxidation catalysts include depositing a precious metal, for example platinum, or a combination of platinum and palladium, on one or more high surface area refractory oxides identified herein. In some embodiments, depositing is performed via an incipient wetness impregnation method as known in the art or as indicated by at least one example herein. In some embodiments, a ratio of Pd/Pt is from 0 to 10, in which such ratio can be 0 to 1.

The platinum metal precursor material or materials, which are supported on the high surface area refractory oxides, are preferably selected from the group consisting of platinum nitrate, platinum sulfite acid, ammonium platinum sulfite, dihydrogen hexahydroxyplatinate, hydrogen tetranitroplatinate, ammonium hexachloroplatinate, dihydrogen hexahydroxy platinate, platinum acetylacetonate, platinum chloride, bis(ethanalammonium)-hexahydroxoplatinate, tetraammineplatinum nitrite, tetraammineplatinum nitrate, tetraammineplatinum hydroxide, platinum oxalate and other similar compounds and mixtures thereof.

Figure 3:
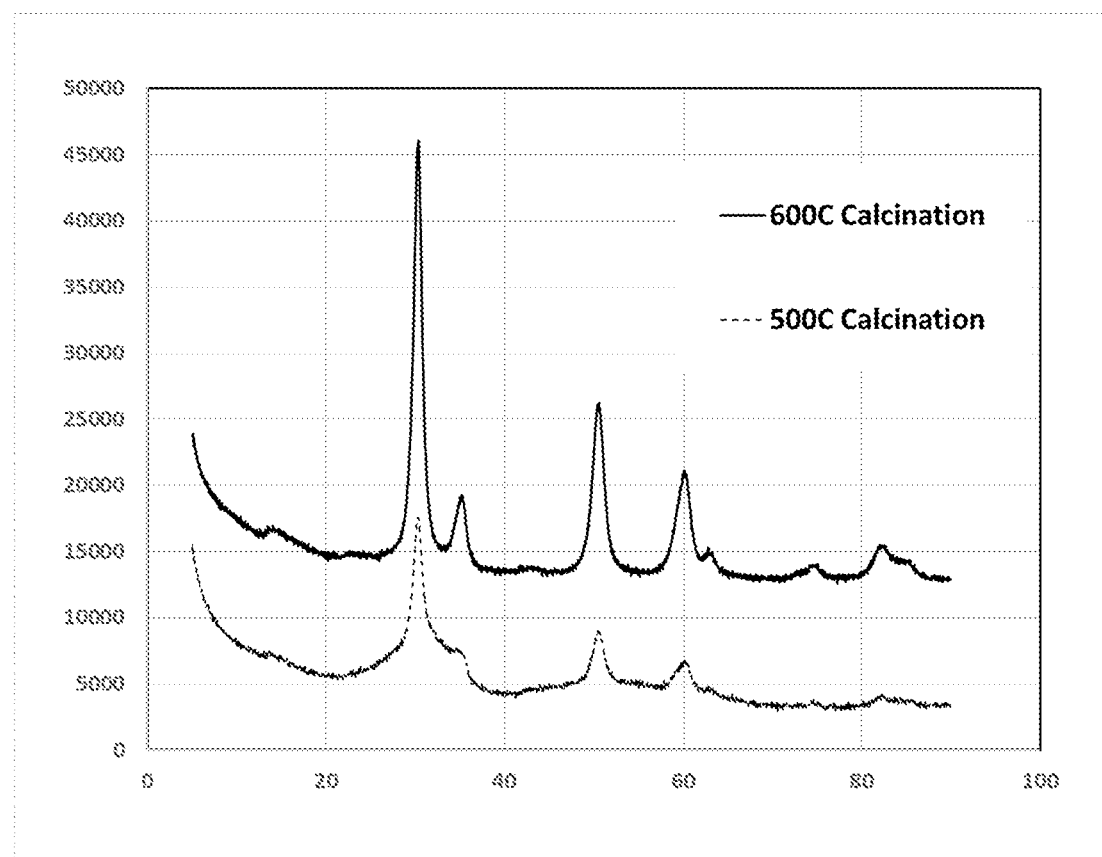
FIG. 3 is an x-ray diffraction plot depicting the structure of a silica- and hafnia-doped zirconia solid solution, in accordance with multiple embodiments and alternatives.

In some embodiments, a silica- and hafnia-doped zirconia is a solid solution. This solid solution can be obtained by adding 1-10 wt % silica in zirconia, and further adding 1-5% hafnia. In an exemplary embodiment, FIG. 3 provides results of x-ray diffraction studies (XRD) which demonstrate a tetragonal or cubic structure of the resulting solid. In some embodiments, a surface area of the silica- and hafnia-doped zirconia is in a range greater than 100-300 $m^2/g$, in particular, surface area of >120 $m^2/g$ at 600° C. calcination condition. In some embodiments, oxidation catalyst materials are supported on a honeycomb substrate or other monolithic substrates via a wash-coating process as known in the art or as indicated by at least one example herein.

An additional high surface area component of the oxidation catalyst is silica. Silica may also be used as an alternative to tin oxide depending on the composition of the emissions stream. Thus, with some compositions, silica is preferable to tin oxide. The preferred silica is precipitated silica powder and has an amorphous phase with surface area more than 200 $m^2/g$, larger pore size which is preferably greater than 100 angstrom, and a particle size average from 0.5 to 12 microns. Other type amorphous silica, such as mesoporous molecular sieves MCM-41 and SBA-15, can be also used as alternative silica. These molecular sieves MCM-41 and SBA-15 also have large surface area more than 200 $m^2/g$, large pore volume and uniform pore-size distribution with more than 100 angstrom, allowing for higher dispersions of active components and better control on the particle size as compared with conventional amorphous silica. The use of silica as a support offers advantages for enhancing the activity of the catalytic oxidation of CO and various VOC hydrocarbons, especially for oxidation of aromatic compounds.

An additional component of the oxidation catalyst, which is deposited upon the substrate, and may be used as an alternative to silica is tin oxide. Tin oxide is especially useful for the oxidation of CO & various hydrocarbon materials. Tin oxide has significant oxygen storage capability and can generate active oxygen for the oxidation of the hydrocarbon compounds. It is preferable that if tin oxide is added, it be added in the form of particles with a size from about 1 micrometer to about 20 micrometers. Usually, although the commercial tin oxide product has low surface area, it still enhances the catalyst performance for destruction CO and aromatic VOC. As desired, a stabilized high surface area tin oxide, which can be obtained by adding silica, can be used to enhance the catalyst performance. In some embodiments, silica doped tin oxide has from about 2 $m^2/g$ to about 200 $m^2/g$. Alternatively, a combination of silica and silica doped tin oxide may be used, depending on the composition of the emission off-gas.

In some embodiments providing monolith oxidation catalyst according to the present disclosure, precious metals loading vary from 0.2-5 g/L (monolith volume), more specifically 1-3 g/L as an option. The content of silica- and hafnia-doped zirconia solid solution, which is contained in wash-coat materials for application to a monolith substrate, is from 25% to 95% by weight, and in some embodiments more specifically from 70% to 95%. The content of high surface area refractory silica is from 1% to 50%, and in some embodiments more specifically 5-30%. The other high surface area refractory oxides may comprise tin oxide, or rare-earth oxides stabilized alumina at the same ranges stated for high surface area refractory silica. Combinations of silica, stabilized high surface area tin oxide, and rare-earth oxides stabilized alumina may be used alone or in combination. Alternative refractory oxides for use in the supports, including combinations, include but are not necessarily limited to, silica-alumina, silica-titania, ceria-zirconia, and titania-zirconia, which may be employed in accordance with the 1 to 50% range stated above, and in some embodiments more specifically 5 to 30%.

The monolith substrate is preferably selected from conventional monolith substrate and sphere beads supports, utilizing a honeycomb, monolith or foam structure through which the emission off-gas pass. Preferably, the substrate has significant flow-through capacity so as not to prevent or restrict significantly the flow of emissions through the substrate.

In some embodiments, the monolith substrate is produced from ceramic materials, such as alumina, silica, titania, zirconia, magnesia, silica-alumina, silica-zirconia, titania-zirconia, titania-silica, alumina-titania, alumina-zirconia, silicon carbide, ceramic cordierite, mullite and mixtures or combinations thereof. Alternatively, metallic or metallic alloy substrates, such as those produced from stainless steel, iron-chromium alloys, nickel-chromium-iron alloys with or with aluminum, and other such metallic substrates may be used. Preferred substrates are formed from commercially available cordierite, mullite, silicon carbide, iron-chromium alloys and stainless steel materials.

In some embodiments, a monolith catalyst according to present embodiments could be made by a one-step wash-coating process, with the slurry of silica- and hafnia-doped zirconia supported and desired precious metal content (i.e., catalyst materials) wash-coated onto monolithic substrates. In an exemplary wash-coating process, catalyst materials are first mixed together with the addition of binders, then milled for a suitable time period to obtain a desirable particle size slurry, then monolith substrates are dipped into the slurry to apply the wash-coat materials over the monolith substrate(s). As needed or desired, excess slurry is removed by air-knife or vacuum suction. The coated substrates then are dried and calcined at a temperature suitable to secure the catalyst materials coated onto the monolith substrates.

Alternatively, a monolith catalyst according to present embodiments could be made by a two-step wash-coating process. In an exemplary process, refractory oxide materials as described herein are first wash-coated onto monolithic substrates. These high surface area refractory materials are mixed together with the addition of binders, then milled for a suitable time period to obtain a desirable particle size slurry. The monolith substrates are then dipped into the slurry and extra slurry is removed by air-knife or vacuum suction. The coated substrates then are dried and calcined at a temperature suitable to secure the refractory oxide materials coated onto the substrate. After that, the coated substrates are dipped into a precious metal solution, and extra solution is removed by air-knife or vacuum suction to achieve desired precious metal loading. The substrates coated with precious metal solution are dried and calcined at a temperature suitable to secure the precious metal onto the refractory oxides which were coated onto the substrate in the previous coating process.

The binders which are used in this disclosure include colloid type materials, such as alumina colloid, silica colloid, tin oxide colloid, zirconia colloid and other zirconium compound colloids. The colloid materials would be preferably low pH aqueous liquid. The content of aqueous colloid in washcoat slurry is from 5% to 50 w %, more preferred 10-30 w %, depending on the solid contents of the commercial colloid materials.

Figure 2:
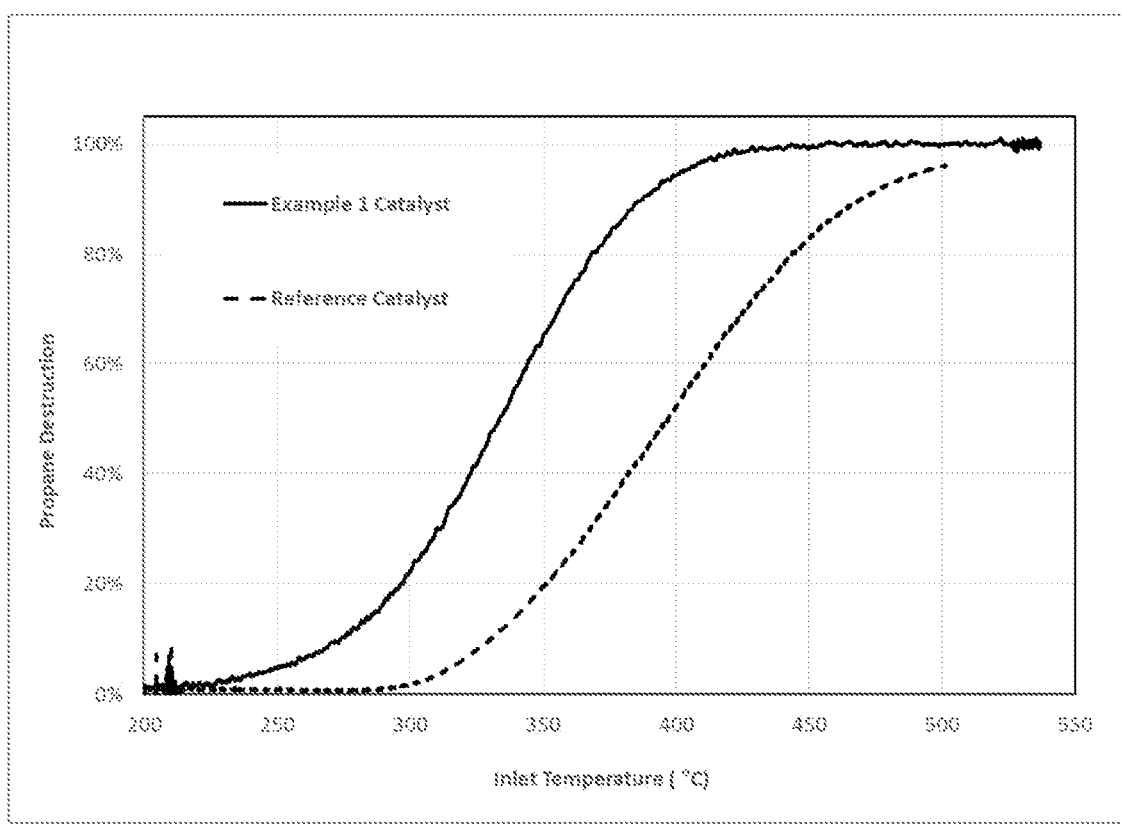
FIG. 2 is a graph comparison of propane oxidation catalyzed by inventive oxidation catalysts against a reference catalyst.

Once the monolith substrate is coated with the oxidation catalyst, it is placed in the emission exhaust flow device system for oxidative destruction of CO and VOCs, particularly containing light alkane compounds VOCs. There, a flow exhaust gas which contains CO and VOCs, including light alkane compounds VOCs, contacts the catalyst, which is deposited on monolith substrates, with a sufficient amount of oxygen at the temperature from 250° C. up to 550° C. and is oxidized into CO2 and water. The catalyst disclosed herein are characterized by high activity for oxidation of these compounds. For example, the light off temperatures for the destruction of propane under 10% water content condition is lower than 350° C., as illustrated in FIG. 2. [The light-off temperature refers to the temperature at the destruction efficiency of 50%] This temperature is significantly lower than is used with prior art reference catalyst.

Catalysts according to present embodiments can operate at a space velocity (GHSV) of 1000-100000 $h^{-1}$, preferably from 5000-60000 $h^{-1}$, to achieve enhanced catalyst performance. The preferred space velocity can be obtained by increasing or decreasing catalyst volumes in the catalytic oxidation reactors.

The catalyst can operate at a wide temperature windows from about 200° C. up to about 600° C., preferably from 250° C. to 550° C., to achieve complete oxidation of CO and various VOC which includes light alkane compounds, from chemical plant off-gas emissions with an sufficient amount of oxygen.

In operation, a catalyst-coated monolith substrate according to multiple embodiments and alternatives may be incorporated in an emission control system for the oxidation destruction of CO and VOCs, which contain light alkane compounds, and other pollutants in accordance with designed system operation conditions and protocols.

EXAMPLES

In view of the teachings contained herein, the following examples identify some of the ways in which the present embodiments can be practiced and the results obtained. These examples are not limiting, but rather are meant to illustrate further the teachings herein.

Example 1

A washcoat slurry was prepared by mixing 900 g silica- and hafnia-doped zirconia powder, 120 g silica which is amorphous and has a surface area of 230 $m^2/g$, 120 g silica colloid, 100 g zirconia colloid and 1.5 liters water, then milling the mixture to a desirable particle size slurry. The zirconia material obtained from commercial supplier had about 5% silica, 2.5% hafnia and a surface area of 160 $m^2/g$ at 600° C. calcination. A metal substrate having a diameter of 1.75 inches, a length of 2.0 inches and a cell density of 400 cpsi was dipped into the washcoat slurry to coat the surfaces of the honeycomb. Extra slurry was removed using an air-knife, and the coated substrate was then dried at 150° C. and calcined at 500° C., yielding a resulting washcoat loading of 120 g/L. A platinum solution with desired concentration to yield specified platinum loading was deposited on the coated substrate by incipient wetness impregnation, followed by drying at 120° C. and calcination at 500° C., yielding a resulting platinum load of 1.7 g/L.

Example 2

A washcoat slurry was prepared by mixing 1000 g silica- and hafnia-doped zirconia powder, 260 g alumina colloid and 1.5 liters water, then milling the mixture to a desirable particle size slurry. The doped zirconia material had a surface area of 160 $m^2/g$ at 600° C. calcination. A ceramic honeycomb substrate having a diameter of 3.66 inches, a length of 2.0 inches and a cell density of 400 cpsi was dipped into the washcoat slurry to coat the surfaces of the honeycomb. Extra slurry was blown out using an air-knife, and the honeycomb was then dried at 150° C. and calcined at 500° C., yielding a resulting washcoat loading of 120 g/L. A platinum solution at a concentration suitable to yield the resulting platinum load specified below was deposited on the coated substrate by incipient wetness impregnation, followed by drying at 120° C. and calcination at 500° C., yielding a resulting platinum load of 1.7 g/L.

Example 3 (Comparative)

A reference metal substrate catalyst, Pt/Pd/$Al_2O_3$, was prepared using rare-earth oxides stabilized alumina for comparison with catalysts as disclosed herein. The loading of platinum and palladium was total 1.7 g/L.

The catalyst coated metal substrate (i.e., catalyst) prepared above in Example 1 was tested in a laboratory reactor with a simulated feed VOC gas at a test space velocity of 20,000 $h^{-1}$. The simulated feed VOC gas was composed of 5000 ppm CO; 1200 ppm propylene, 100 ppm methane, 100 ppm ethane, 800 ppm propane; 10 v % $H_2O$, 5 v % oxygen and nitrogen balance. A FTIR gas analyzer was used for monitoring the oxidation reaction, with results illustrated in FIG. 1.

Figure 1:
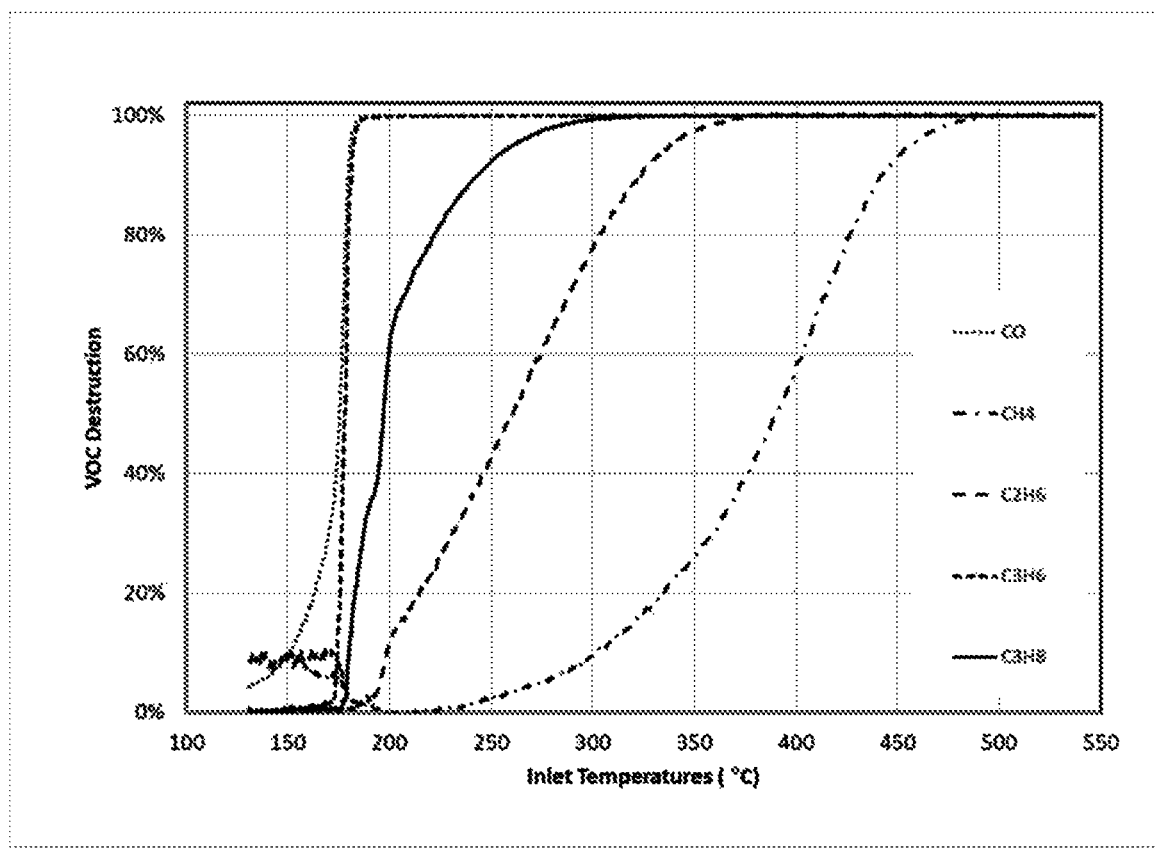
FIG. 1 is a graph showing results of a simulated feed stream contains VOCs passed over an oxidation catalyst according to Example 1, in accordance with multiple embodiments and alternatives.

The test results of the catalyst made in example 1 under 10% water content condition are graphed, based on the destruction of CO, propylene and several light alkanes (methane, $CH_4$; ethane, $C_2H_6$; and propane ($C_3H_8$) versus inlet temperature As shown in FIG. 1, CO and propylene were completely destructed at under 200° C. the curve for propane destruction catalyzed by the oxidation catalyst of Example 1 was the next most efficient. 80% of the propane was destroyed at an inlet temperature of 225° C., the propane was completely substantially destroyed at 320° C. Ethane was completely destructed at about 370° C. Of the compounds shown in FIG. 1, methane destruction required the most activation energy in the presence of the oxidation catalyst. At 400° C. approximately 60% of the methane was destroyed, with substantial destruction reached at a temperature between 450° C. and 500° C.

FIG. 2 is a comparison of propane oxidation only in feed 300 ppm propane and 10% water content in stream flowing at gas hourly space velocity (GHSV), 30,000 $h^{-1}$ based on VOC destruction versus catalyst bed inlet temperature. The performance of the oxidation catalyst of Example 1, for instance, was superior to that of the reference catalyst of Example 3. By comparison of light-off temperature for destructing propane, the oxidation catalyst of Example 1 demonstrated light-off temperature at 340° C., while the reference catalyst of Example 3 demonstrated light-off temperature at 400° C.; and the oxidation catalyst of Example 1 achieved completely destruct for propane at 430° C., while reference catalyst did so at above 500-550° C.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. An oxidation catalyst for the destruction of CO and volatile organic compounds, including light alkane organic compounds, from an emissions stream, wherein the oxidation catalyst comprises one or more platinum group metals supported on a high surface area refractory oxide, comprising a solid solution of silica- and hafnia-doped zirconia; and at least one of silica, tin oxide, and stabilized alumina.

2. The oxidation catalyst of claim 1, further comprising a substrate on which the oxidation catalyst is deposited.

3. The oxidation catalyst of claim 2, wherein the substrate comprises a honeycomb or a monolithic structure.

4. The oxidation catalyst of claim 2, wherein the substrate is produced from materials chosen from the group consisting of cordierite, mullite, silicon carbide, iron-chromium alloy and stainless steel.

5. The oxidation catalyst of claim 1, wherein the platinum group metals are deposited on the substrate at a loading that comprise from 0.5 g/L to 5 g/L.

6. The oxidation catalyst of claim 1, wherein the solid solution of silica- and hafnia-doped zirconia is a tetragonal or cubic crystal phase, and has a BET surface area from 50-300 $m^2/g$.

7. The oxidation catalyst of claim 6, wherein the solid solution of silica- and hafnia-doped zirconia has silica at a weight percentage of 1-10% and hafnia at a weight percentage of 0.5-5%.

8. The oxidation catalyst of claim 1, wherein the solid solution of silica- and hafnia-doped zirconia has a BET surface area >120 $m^2/g$ at 600° C. calcination.

9. The oxidation catalyst of claim 1, wherein the one or more platinum group metals comprise platinum or a combination of platinum and at least one other platinum group metal chosen from palladium, rhodium, and ruthenium.

10. The oxidation catalyst of claim 1, wherein the one or more platinum group metals consists essentially of platinum.

11. The oxidation catalyst of claim 1, wherein the silica comprises amorphous silica.

12. The oxidation catalyst of claim 11, wherein the silica is chosen from the group consisting of precipitated silica and molecular sieves MCM-41 and SBA-15 and having a surface area greater than 100 $m^2/g$.

13. The oxidation catalyst of claim 1, wherein the high surface area refractory oxide comprises tin oxide having a surface area from 2 $m^2/g$ to 200 $m^2/g$.

14. The oxidation catalyst of claim 1, wherein silica comprises from about 5% to about 50%, by weight of the oxidation catalyst.

15. The oxidation catalyst of claim 1, wherein the high surface area refractory oxide comprises tin oxide and tin oxide comprises 5 to about 50 percent by weight of the oxidation catalyst.

16. The oxidation catalyst of claim 1, wherein the refractory oxide comprises from about 10 to about 95 percent by weight of the oxidation catalyst.

17. The oxidation catalyst of claim 1, wherein stabilized alumina comprises 5 to about 50 percent by weight of the oxidation catalyst, and the alumina is stabilized by blending rare-earth elements with the alumina.

18. The oxidation catalyst of claim 17, wherein the rare-earth elements are chosen from the group consisting of lanthanum, cerium and yttrium.

19. An oxidation catalyst for the destruction of CO and volatile organic compounds having light alkane organic compounds, wherein the oxidation catalyst comprises at least one of platinum metal or a combination of platinum and palladium, supported on a refractory oxide solid solution of silica- and hafnia-doped zirconia, wherein the refractory oxide solid solution is further blended with at least one of silica, tin oxide, and stabilized alumina.

20. A process for the production of an oxidation catalyst deposited on a substrate for the destruction of CO and volatile organic compounds, including light alkane organic compounds, from an emissions stream, the process comprising:
preparing an aqueous mixture slurry of silica- and hafnia-doped zirconia combined with at least one of silica, tin oxide and stabilized alumina;
blending the mixture with binders;
coating a substrate with the blended mixture;
drying and calcining the coated substrate;
depositing at least platinum metal precursor materials, comprising at least one of platinum or a combination of platinum and palladium, on the calcined coated substrate; and
calcining the platinum group metals coated substrate.

21. The process of claim 20, further comprising blending the aqueous mixture with a binder chosen from the group consisting of colloidal alumina, colloidal silica, colloidal tin oxide, colloidal zirconia and mixtures thereof.

22. A process for the production of an oxidation catalyst for the destruction of CO and volatile organic compounds from an emissions stream, the volatile organic compounds having light alkane organic compounds, the process comprising:
depositing at least one platinum metal precursor on high surface area refractory oxides of silica- and hafnia-doped zirconia combined with at least one of silica, tin oxide and stabilized alumina;
blending the mixture with binders;
coating a substrate with the blended mixture; and
drying and calcining the coated substrate.

23. A method for treating a gas stream having constituents chosen from the group consisting of CO, VOCs which includes light alkane VOCs, and mixtures thereof, the method comprising contacting said gas stream with a sufficient amount of oxygen and at a temperature from about 250° C. to 550° C. with the catalyst of claim 1 to react said compounds.

24. The method of claim 23 wherein the one light alkane VOC's include at least one light alkane chosen from the group consisting of ethane, propane, and butane.

* * * * *